(12) United States Patent
Mikami

(10) Patent No.: US 10,939,055 B2
(45) Date of Patent: Mar. 2, 2021

(54) IMAGING CONTROL APPARATUS AND IMAGE CONTROL METHOD

(71) Applicant: SONY CORPORATION, Tokyo (JP)

(72) Inventor: Takuya Mikami, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/073,617

(22) PCT Filed: Jan. 17, 2017

(86) PCT No.: PCT/JP2017/001379
§ 371 (c)(1),
(2) Date: Jul. 27, 2018

(87) PCT Pub. No.: WO2017/149962
PCT Pub. Date: Sep. 8, 2017

(65) Prior Publication Data
US 2019/0037156 A1 Jan. 31, 2019

(30) Foreign Application Priority Data
Mar. 2, 2016 (JP) .................. 2016-039868

(51) Int. Cl.
*H04N 5/351* (2011.01)
*H04N 5/345* (2011.01)
(Continued)

(52) U.S. Cl.
CPC ............... *H04N 5/351* (2013.01); *G06T 7/20* (2013.01); *H04N 5/225* (2013.01); *H04N 5/238* (2013.01);
(Continued)

(58) Field of Classification Search
CPC .......... G06T 7/20; H04N 5/225; H04N 5/378; H04N 5/351; H04N 5/345; H04N 5/3765
See application file for complete search history.

(56) References Cited

U.S. PATENT DOCUMENTS

| 8,735,796 | B2* | 5/2014 | Shimizu | ............... | H04N 5/3577 250/208.1 |
| 2007/0171298 | A1* | 7/2007 | Kurane | ................ | H04N 5/2353 348/362 |

(Continued)

FOREIGN PATENT DOCUMENTS

| CN | 102905087 A | 1/2013 |
| JP | 2009-33305 A | 2/2009 |

(Continued)

OTHER PUBLICATIONS

International Search Report and Written Opinion of PCT Application No. PCT/JP2017/001379, dated Feb. 14, 2017, 10 pages of ISRWO.

*Primary Examiner* — Zaihan Jiang
(74) *Attorney, Agent, or Firm* — Chip Law Group

(57) ABSTRACT

An imaging control apparatus of the present disclosure includes a controller that performs a readout operation on a plurality of pixels in an imaging device, and performs control on a basis of a moving object detection result to cause a time length of the readout operation on a first pixel to differ from a time length of the readout operation on a second pixel, the first pixel corresponding to a detection region where a moving object has been detected, and the second pixel corresponding to a region other than the detection region.

13 Claims, 12 Drawing Sheets

(51) Int. Cl.
  *H04N 5/378*    (2011.01)
  *G06T 7/20*     (2017.01)
  *H04N 5/238*    (2006.01)
  *H04N 5/225*    (2006.01)
  *H04N 5/341*    (2011.01)
  *H04N 5/353*    (2011.01)
  *H04N 5/369*    (2011.01)
  *H04N 5/376*    (2011.01)

(52) U.S. Cl.
  CPC ............. *H04N 5/341* (2013.01); *H04N 5/345* (2013.01); *H04N 5/3535* (2013.01); *H04N 5/378* (2013.01); *H04N 5/379* (2018.08); *G06T 2207/30196* (2013.01); *G06T 2207/30232* (2013.01); *G06T 2207/30248* (2013.01); *H04N 5/3765* (2013.01)

(56) References Cited

U.S. PATENT DOCUMENTS

| | | | | |
|---|---|---|---|---|
| 2007/0216564 | A1* | 9/2007  | Koseki    | H03M 1/0604 341/155 |
| 2008/0158361 | A1* | 7/2008  | Itoh      | G08B 13/19602 348/155 |
| 2009/0122174 | A1* | 5/2009  | Kano      | H04N 5/361 348/308 |
| 2009/0303338 | A1* | 12/2009 | Chaurasia | H04N 5/2624 348/222.1 |
| 2010/0020211 | A1* | 1/2010  | Inada     | H04N 5/335 348/294 |
| 2010/0053395 | A1* | 3/2010  | Motonaga  | H04N 5/23245 348/300 |
| 2012/0113267 | A1* | 5/2012  | Ishige    | H04N 5/145 348/169 |
| 2013/0027595 | A1  | 1/2013  | Hashizume | |
| 2014/0055642 | A1* | 2/2014  | Uchida    | H04N 5/357 348/231.99 |
| 2014/0098886 | A1* | 4/2014  | Crenshaw  | H04N 19/176 375/240.16 |
| 2015/0077590 | A1* | 3/2015  | Kuriyama  | H04N 5/3745 348/231.99 |
| 2015/0312493 | A1* | 10/2015 | Aldridge  | H04N 5/04 348/157 |
| 2015/0312494 | A1* | 10/2015 | Aldridge  | H04N 5/04 348/157 |
| 2015/0312497 | A1* | 10/2015 | Aldridge  | H04N 5/23232 348/157 |
| 2015/0312504 | A1* | 10/2015 | Aldridge  | H04N 5/3743 348/157 |
| 2016/0182866 | A1* | 6/2016  | Landqvist | H04N 7/183 348/143 |
| 2017/0104944 | A1* | 4/2017  | Kikuchi   | H04N 5/232122 |
| 2017/0194374 | A1* | 7/2017  | Jacob     | H01L 27/14634 |
| 2017/0194375 | A1* | 7/2017  | Jacob     | G01P 15/093 |
| 2017/0322232 | A1* | 11/2017 | Ueda      | G01T 1/2018 |
| 2017/0352136 | A1* | 12/2017 | Uliyar    | H04N 5/247 |
| 2018/0120847 | A1* | 5/2018  | Chen      | G05D 1/0094 |
| 2018/0295309 | A1* | 10/2018 | Kuriyama  | H04N 5/3745 |

FOREIGN PATENT DOCUMENTS

| | | |
|---|---|---|
| JP | 2012-48476 A   | 3/2012 |
| JP | 2013-27014 A   | 2/2013 |
| JP | 2015-186155 A  | 10/2015 |

* cited by examiner

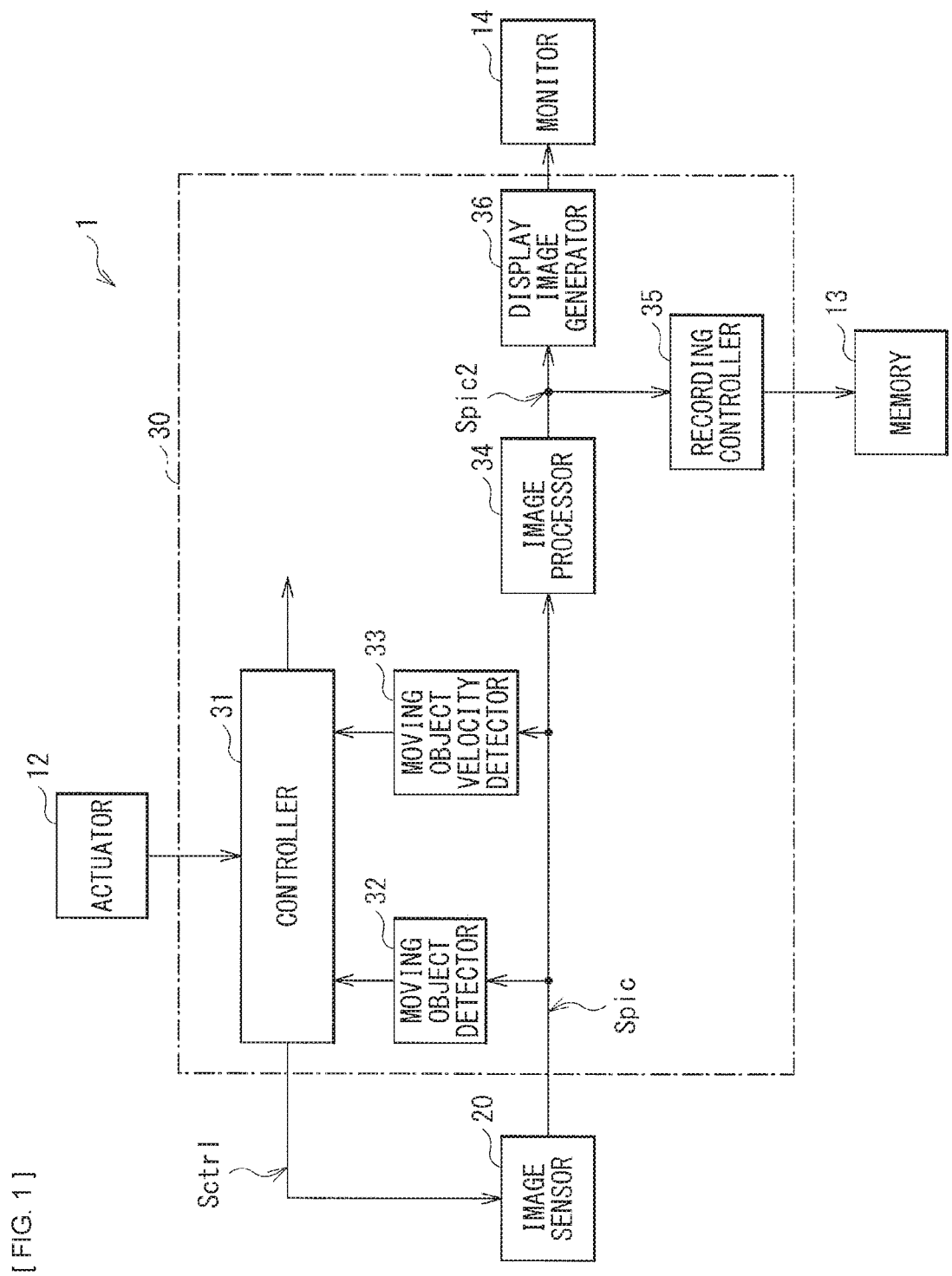

[FIG. 2]
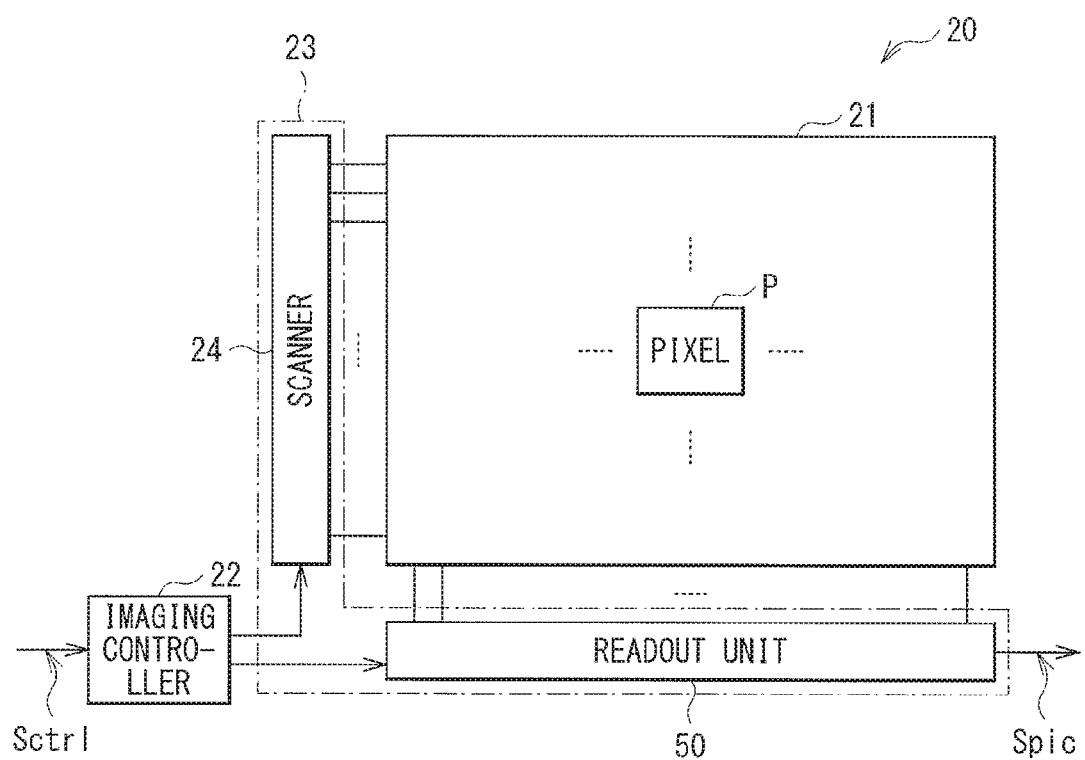
[FIG. 3]
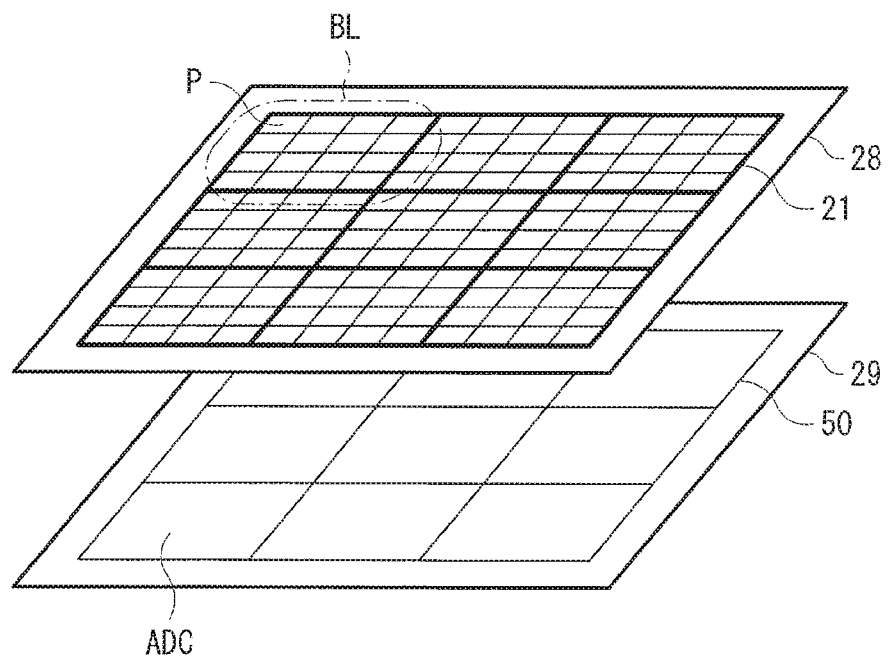

[FIG. 4]
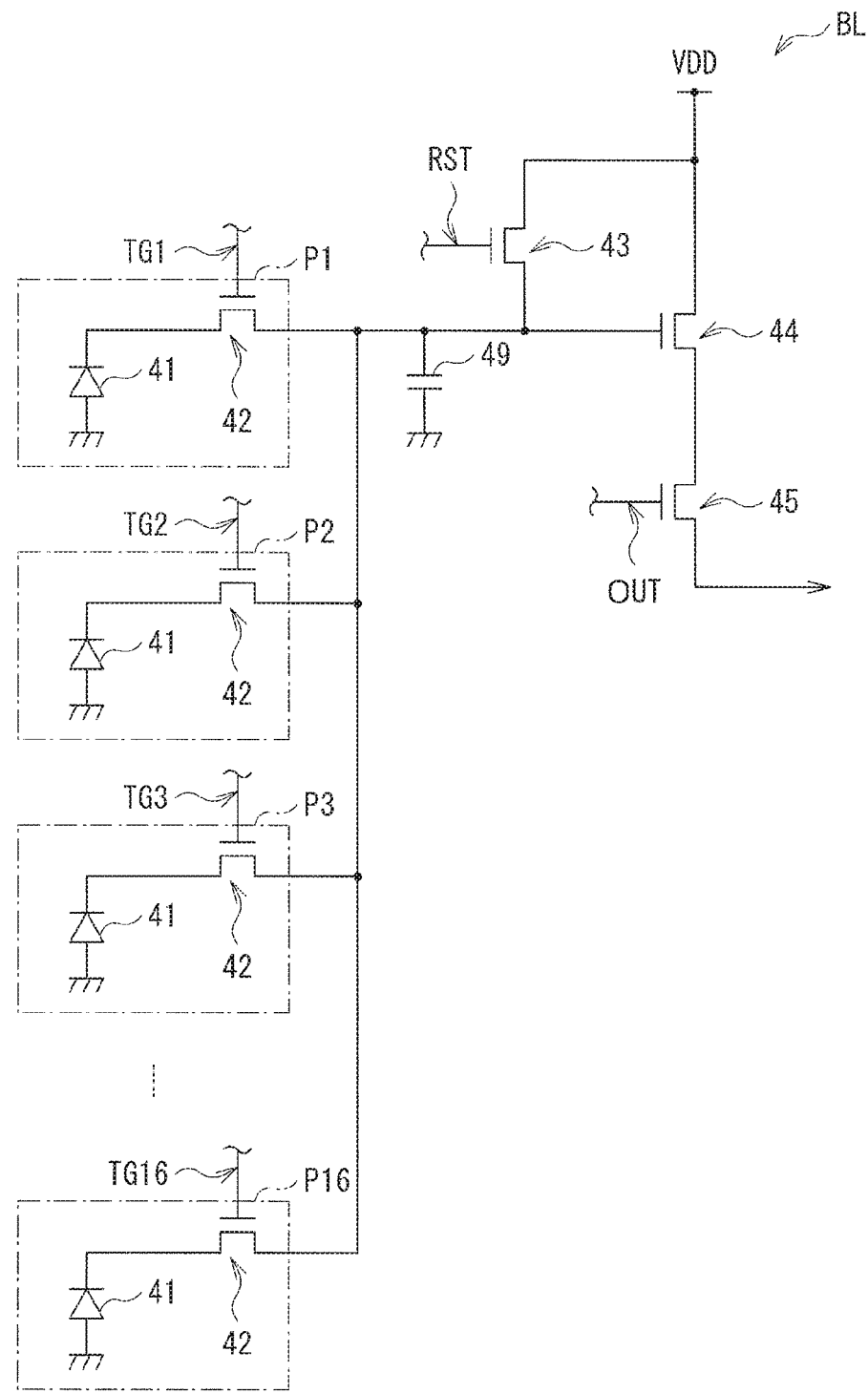

[FIG. 5]
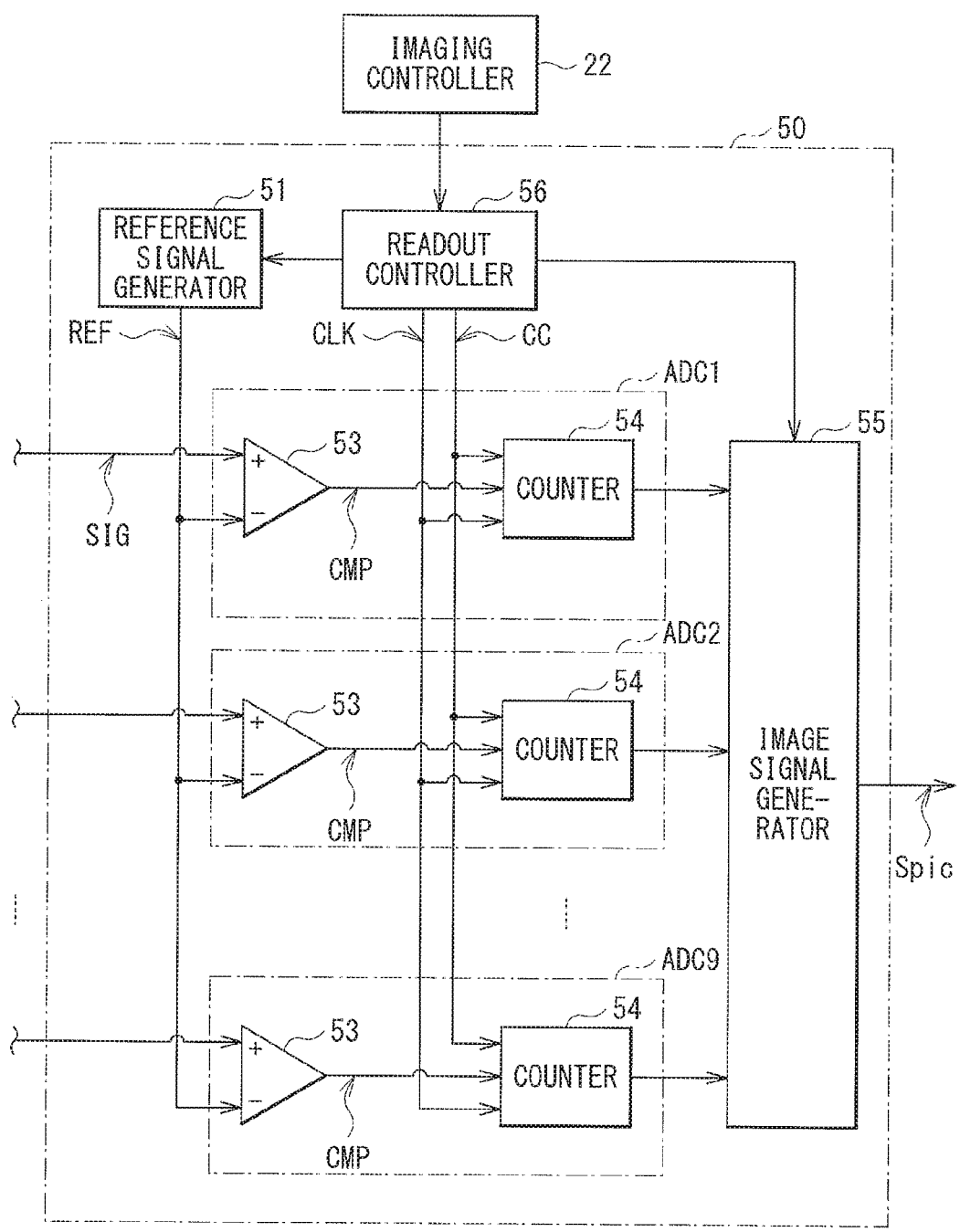

[ FIG. 6 ]
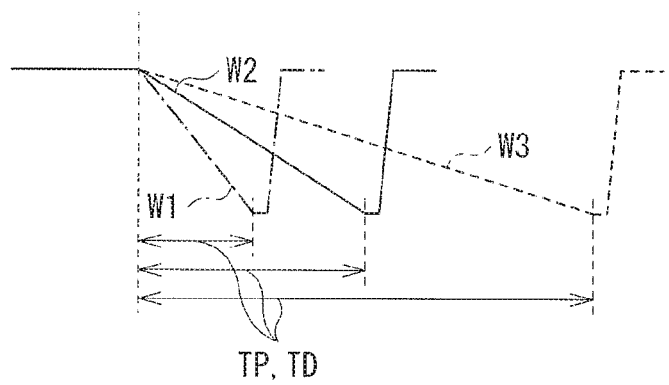
[ FIG. 7 ]
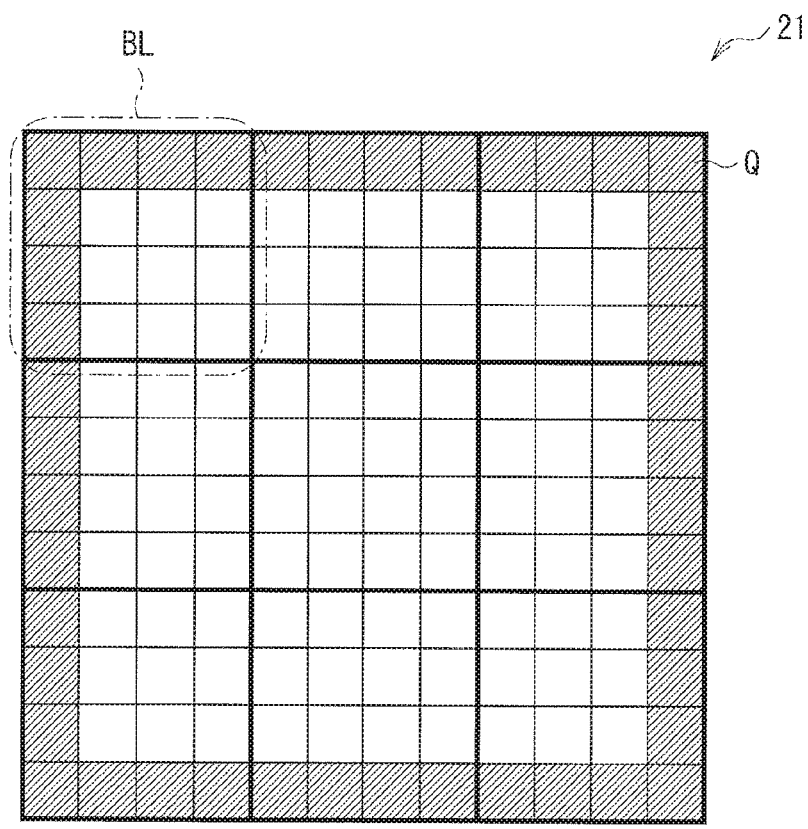

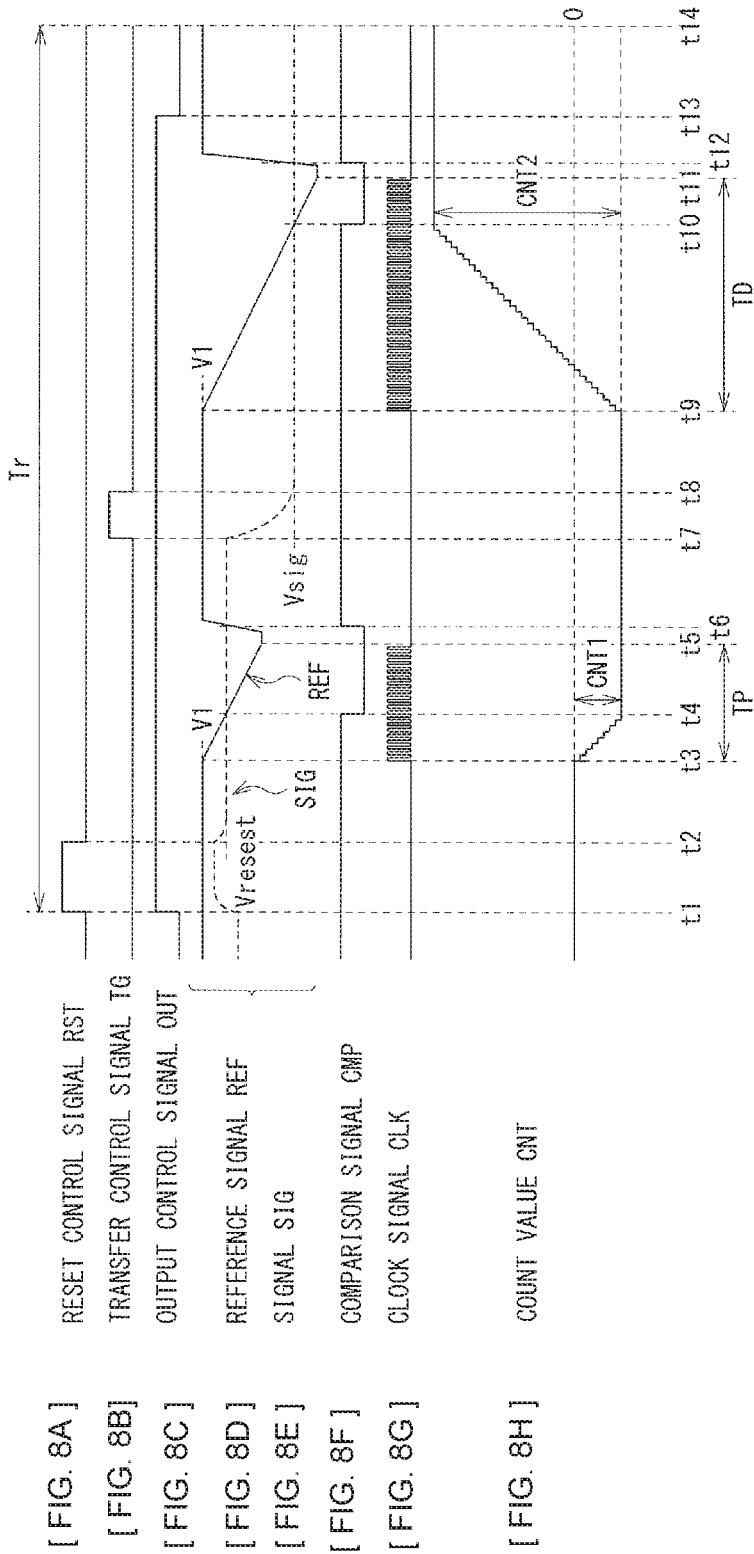

[FIG. 9]
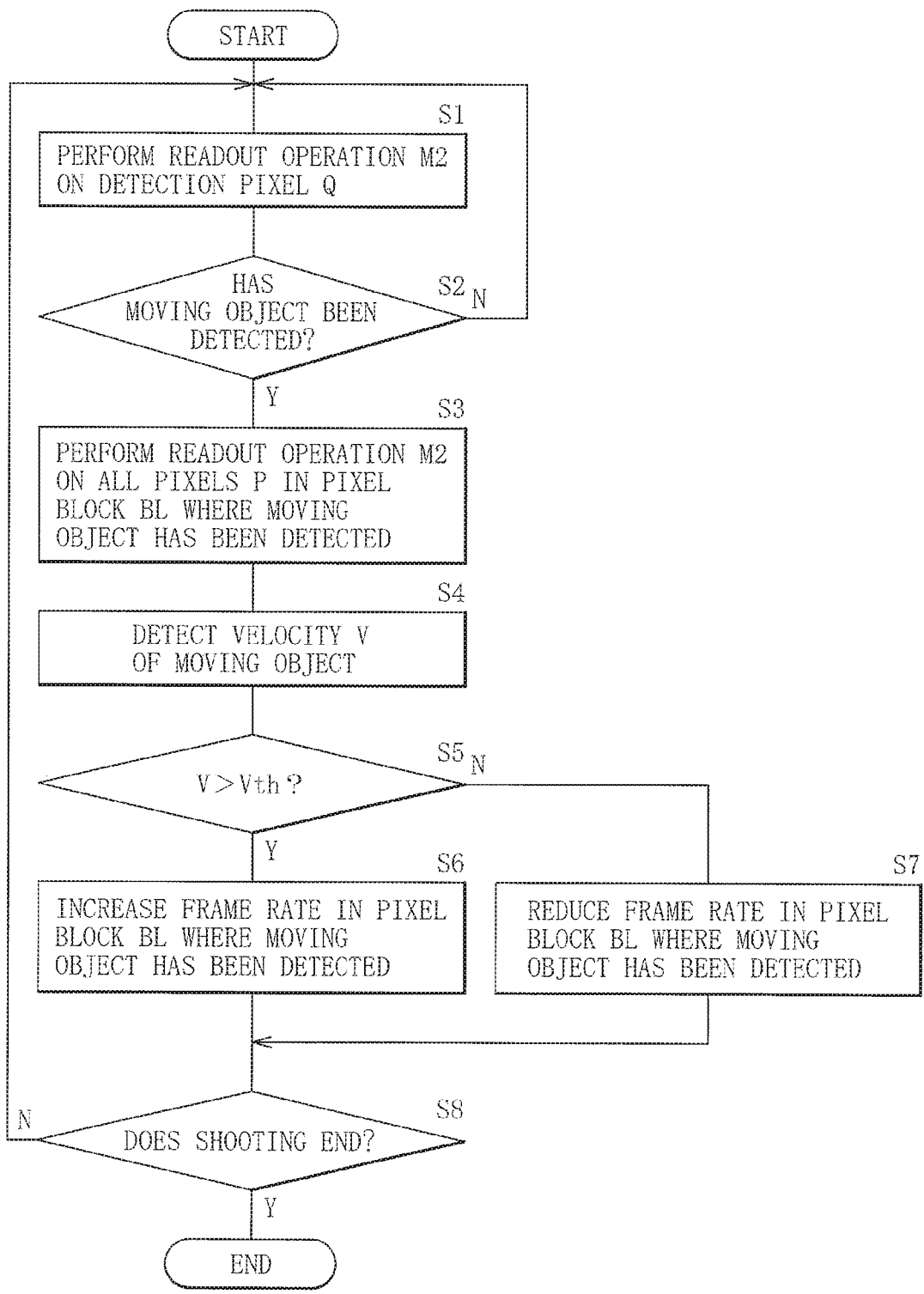

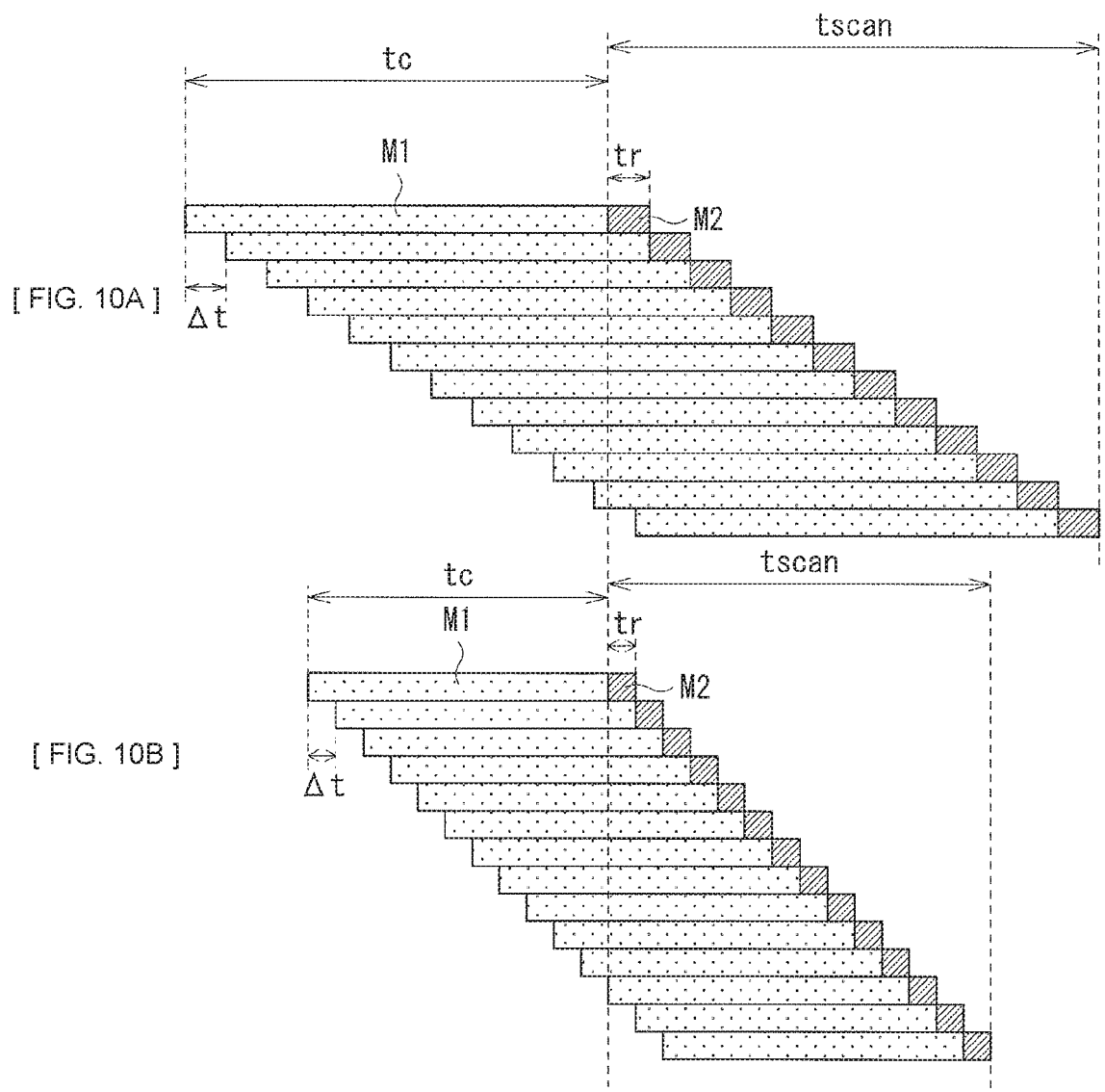

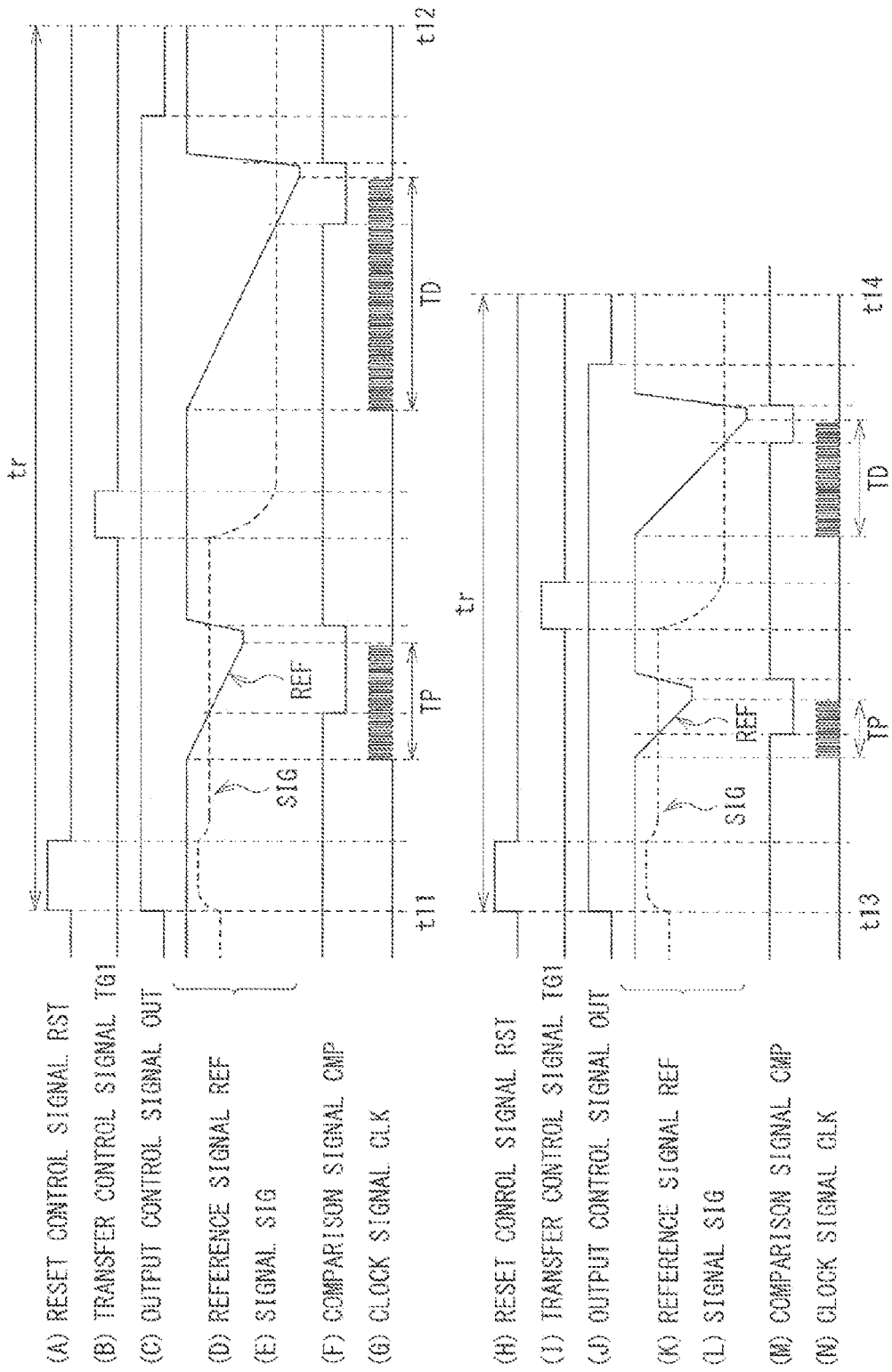

[FIG. 12]
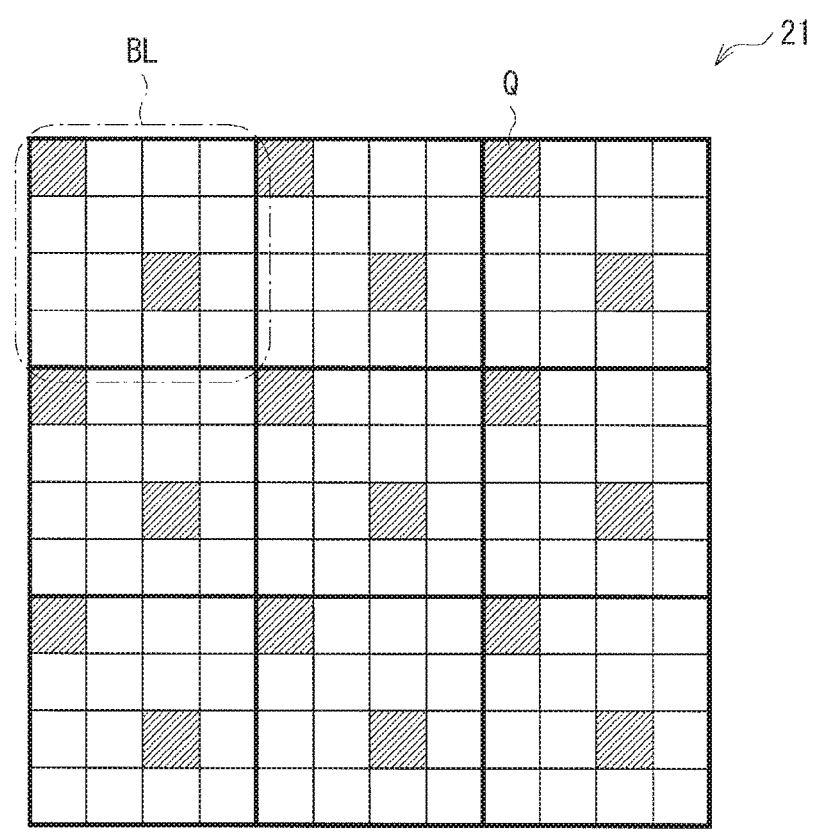

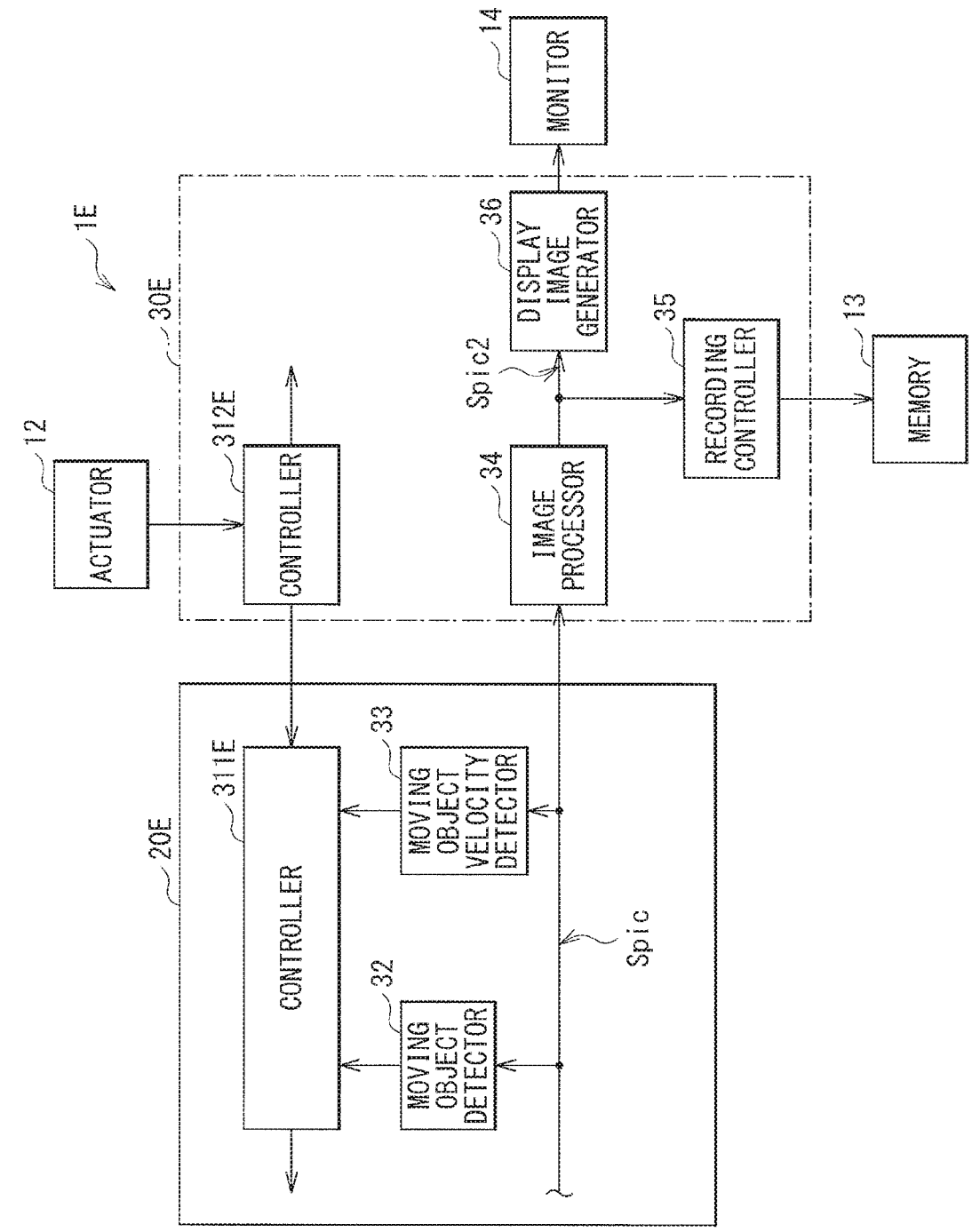
[FIG. 13]

[FIG. 14]
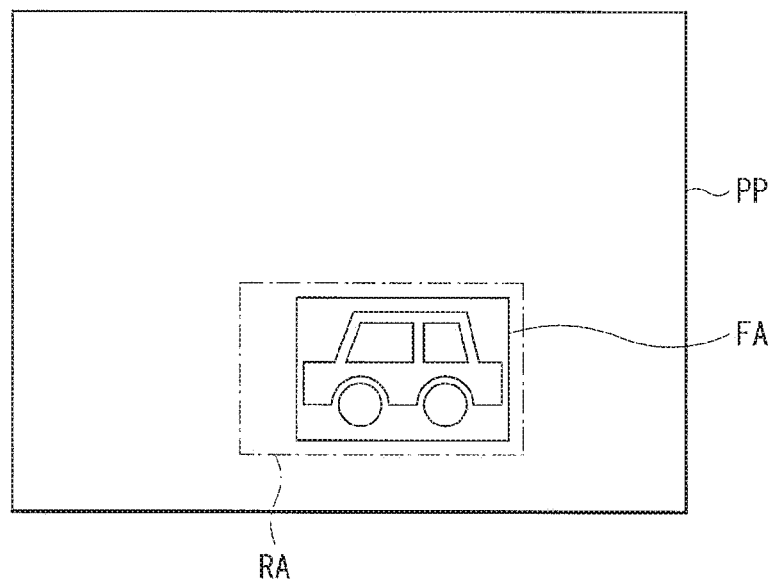
[FIG. 15]
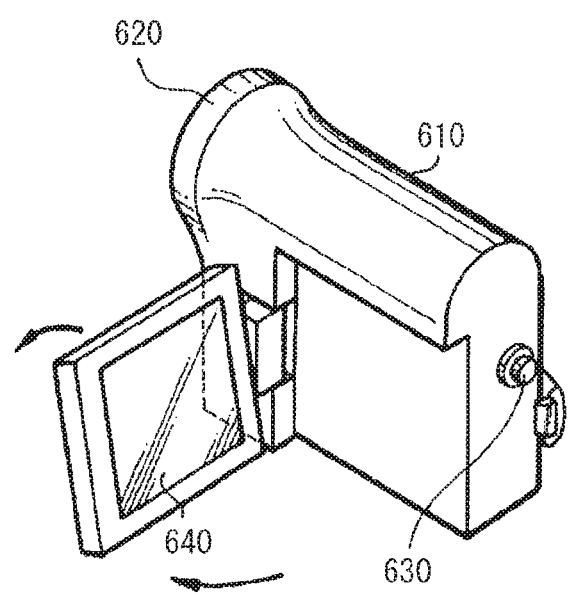

IMAGING CONTROL APPARATUS AND IMAGE CONTROL METHOD

CROSS REFERENCE TO RELATED APPLICATIONS

This application is a U.S. National Phase of International Patent Application No. PCT/JP2017/001379 filed on Jan. 17, 2017, which claims priority benefit of Japanese Patent Application No. JP 2016-039868 filed in the Japan Patent Office on Mar. 2, 2016. Each of the above-referenced applications is hereby incorporated herein by reference in its entirety.

TECHNICAL FIELD

The present disclosure relates to an imaging control apparatus that controls an imaging operation, an imaging control method that is used in such an imaging control apparatus, and a program that controls the imaging operation.

BACKGROUND ART

In recent years, various electronic apparatuses have been mounted with an imaging apparatus. For the imaging apparatus, for example, an imaging apparatus that sets a readout region depending on a subject and reads out a pixel signal from the readout regions is disclosed (PTL 1 and PTL 2, for example).

CITATION LIST

Patent Literature

PTL 1: Japanese Unexamined Patent Application Publication No. 2010-8855
PTL 2: Japanese Unexamined Patent Application Publication No. 2012-60371

SUMMARY OF THE INVENTION

Incidentally, in an imaging apparatus, high quality (image quality) of a taken image is desired, and thus a further improvement in the image quality is expected.

It is desirable to provide an imaging control apparatus, an imaging control method, and a program that allow for an improvement in image quality of a taken image.

An imaging control apparatus according to an embodiment of the present disclosure includes a controller. The controller performs a readout operation on a plurality of pixels in an imaging device, and performs control on the basis of a moving object detection result to cause a time length of the readout operation on a first pixel to differ from a time length of the readout operation on a second pixel, the first pixel corresponding to a detection region where a moving object has been detected, and the second pixel corresponding to a region other than the detection region.

An imaging control method according to an embodiment of the present disclosure includes: performing a readout operation on a plurality of pixels in an imaging device; and performing control on the basis of a moving object detection result to cause a time length of the readout operation on a first pixel to differ from a time length of the readout operation on a second pixel, the first pixel corresponding to a detection region where a moving object has been detected, and the second pixel corresponding to a region other than the detection region.

A program according to an embodiment of the present disclosure causes an imaging control apparatus to perform a readout operation on a plurality of pixels in an imaging device, and perform control on the basis of a moving object detection result to cause a time length of the readout operation on a first pixel to differ from a time length of the readout operation on a second pixel, the first pixel corresponding to a detection region where a moving object has been detected, and the second pixel corresponding to a region other than the detection region.

In the imaging control apparatus, the imaging control method, and the program according to the respective embodiments of the present disclosure, the readout operation is performed on the plurality of pixels in the imaging device. At this time, control is performed on the basis of the moving object detection result to cause the time length of the readout operation on the first pixel corresponding to the detection region where the moving object has been detected to differ from the time length of the readout operation on the second pixel corresponding to the region other than the detection region.

According to the imaging control apparatus, the imaging control method, and the program of the respective embodiments of the present disclosure, control is performed on the basis of the moving object detection result to cause the time length of the readout operation on the first pixel corresponding to the detection region where the moving object has been detected to differ from the time length of the readout operation on the second pixel corresponding to the region other than the detection region, which makes it possible to improve image quality of an taken image. It is to be noted that effects described here are not necessarily limited and may include any of effects described in the present disclosure.

BRIEF DESCRIPTION OF DRAWINGS

FIG. 1 is a block diagram illustrating a configuration example of an imaging apparatus according to an embodiment in the present disclosure.
FIG. 2 is a block diagram illustrating a configuration example of an image sensor illustrated in FIG. 1.
FIG. 3 is an explanatory diagram illustrating a configuration example of the image sensor illustrated in FIG. 1.
FIG. 4 is a circuit diagram illustrating a configuration example of a pixel block illustrated in FIG. 3.
FIG. 5 is a block diagram illustrating a configuration example of a readout unit illustrated in FIG. 2.
FIG. 6 is a waveform chart illustrating an example of a reference signal illustrated in FIG. 5.
FIG. 7 is an explanatory diagram illustrating an arrangement example of detection pixels.
FIGS. [8A, 8B, 8C, 8D, 8E, 8F, 8G, and 8H] FIGS. 8A, 8B, 8C, 8D, 8E, 8F, 8G, and 8H are timing waveform diagrams illustrating an operation example of the image sensor illustrated in FIG. 1.
FIG. 9 is a flow chart illustrating an operation example of the imaging apparatus illustrated in FIG. 1.
FIGS. [10A and 10B] FIGS. 10A and 10B are timing charts illustrating an operation example of the image sensor illustrated in FIG. 1.
FIG. 11 is another timing waveform diagram illustrating an operation example of the image sensor illustrated in FIG. 1.

FIG. 12 is an explanatory diagram illustrating an arrangement example of detection pixels according to a modification example.

FIG. 13 is a block diagram illustrating a configuration example of an imaging apparatus according to the modification example.

FIG. 14 is an explanatory diagram illustrating an example of a display image displayed on a monitor in the imaging apparatus according to the modification example.

FIG. 15 is a perspective view of an external appearance configuration of a video camera to which the embodiment is applied.

MODES FOR CARRYING OUT THE INVENTION

In the following, some embodiments of the present disclosure are described in detail with reference to the drawings. It is to be noted that the description is given in the following order.
1. Embodiment
2. Application Example
1. Embodiment
Configuration Example
(Overall Configuration Example)

FIG. 1 illustrates a configuration example of an imaging apparatus (imaging apparatus 1) according to an embodiment. The imaging apparatus 1 is an imaging apparatus that uses an electronic shutter system, and is able to take a moving image. It is to be noted that an imaging control apparatus and an imaging control method according to respective embodiments of the present disclosure are embodied by the present embodiment and thus are described together.

The imaging apparatus 1 includes an image sensor 20, an actuator 12, a memory 13, a monitor 14, and a processor 30.

The image sensor 20 performs an imaging operation, and is configured using a chip of a CMOS (Complementary Metal Oxide Semiconductor) image sensor, for example. The image sensor 20 performs the imaging operation on the basis of an imaging control signal Sctr1 supplied from the processor 30, and supplies an acquired taken image to the processor 30 as an image signal Spic.

FIG. 2 illustrate a configuration example of the image sensor 20. The image sensor 20 includes a pixel array 21, an imaging controller 22, and a drive unit 23.

The pixel array 21 includes a plurality of pixels P disposed in a matrix. The pixels P each output a signal that corresponds to an amount of received light.

FIG. 3 illustrates a configuration example of the image sensor 20. The image sensor 20 includes an upper substrate 28 and a lower substrate 29. The pixel array 21 is formed on the upper substrate 28. The pixel array 21 is divided into a plurality (9 in this example) of areas, and a pixel block BL that includes a plurality (16 in this example) of pixels P is formed in each area. Moreover, a readout unit 50 (to be described later) of the drive unit 23 is formed on the lower substrate 29. Specifically, AD convertors ADC (to be described later) included in the readout unit 50 are formed at respective positions on the lower substrate 29. The positions correspond to the respective pixel blocks BL on the upper substrate 28. The upper substrate 28 and the lower substrate 29 are electrically coupled by Cu—Cu bonding, for example. It is to be noted that in this example, the pixel array 21 is divided into 9 areas, but the number of areas is not limited thereto. Alternatively, the pixel array 21 may be divided into 8 or less areas or 10 or more areas, for example.

In addition, in this example, although each of the pixel blocks BL includes 16 pixels P, the number of pixels P is not limited thereto. Alternatively, each of the pixel blocks BL may include 15 or less pixels P or 17 or more pixels P, for example.

FIG. 4 illustrates an example of a circuit configuration of the pixel block BL. The pixel block BL includes a plurality of pixels (16 pixels P1 to P16 in this example), a floating diffusion 49, and transistors 43 to 45.

The pixel P includes a photodiode 41 and a transistor 42. The photodiode 41 is a photoelectric converter that generates an electric charge corresponding to the amount of received light and internally accumulates the electric charge. The photodiode 41 receives light that penetrates through, for example, an unillustrated color filter. An anode of the photodiode 41 is grounded, and a cathode thereof is coupled to a source of the transistor 42. In this example, the transistor 42 is an N-type MOS (Metal Oxide Semiconductor) transistor. A transfer control signal TG is supplied to a gate of the transistor 42 by a scanner 24 (to be described later) of the drive unit 23. Specifically, a transfer control signal TG1 is supplied to the gate of the transistor 42 of the pixel P1, and a transfer control signal TG2 is supplied to the gate of the transistor 42 of the pixel P2. The transfer control signal TG is similarly supplied to the pixels P3 to P16. The source of the transistor 42 is coupled to the cathode of the photodiode 41, and a drain thereof is coupled to the floating diffusion 49, a source of the transistor 43, and a gate of the transistor 44.

The floating diffusion 49 accumulates the electric charge. In this diagram, the floating diffusion 49 is depicted as a capacitor. The floating diffusion 49 is coupled to the drains of the transistors 42 of the pixels P1 to P16, the source of the transistor 43, and the gate of the transistor 44.

With this configuration, in the pixel block BL, the transistor 42 of one of the pixels P1 to P16 is turned on, for example, on the basis of the transfer control signals TG1 to TG16, and the electric charge generated in the photodiode 41 of that pixel is transferred to the floating diffusion 49 (transfer operation).

In this example, the transistor 43 is an N-type MOS transistor. A gate thereof is supplied with a reset control signal RST by the scanner 24 (to be described later) of the drive unit 23, a drain thereof is supplied with a source voltage VDD, and the source thereof is coupled to the floating diffusion 49, the drains of the transistors 42 of the pixels P1 to P16, and the gate of the transistor 44.

With this configuration, in the pixel block BL, in advance of transfer of the electric charge from any of the pixels P1 to P16 to the floating diffusion 49, the transistor 43 is turned on, on the basis of the reset control signal RST, and the source voltage VDD is supplied to the floating diffusion 49. This resets a voltage of the floating diffusion 49 (reset operation) in the pixel block BL.

In this example, the transistors 44 and 45 are N-type MOS transistors. The gate of the transistor 44 is coupled to the floating diffusion 49, the drains of the transistors 42 of the pixels P1 to P16, and the source of the transistor 43, the drain thereof is supplied with the source voltage VDD, and the source thereof is coupled to a drain of the transistor 45. A gate of the transistor 45 is supplied with an output control signal OUT by the scanner 24 (to be described later) of the drive unit 23, the drain thereof is coupled to the source of the transistor 44, and a source thereof is coupled to the readout unit 50 (to be described later) of the drive unit 23.

With this configuration, in the pixel block BL, the transistor 45 is turned on, on the basis of the output control signal OUT, and the transistor 44 outputs, as a signal SIG, a voltage corresponding to the voltage of the floating diffusion 49 via the transistor 45. Specifically, as described later, in a P-phase (Pre-charge phase) period TP after the voltage of the floating diffusion 49 is reset, the transistor 44 outputs, as the signal SIG, a voltage Vreset corresponding to the voltage of the floating diffusion 49 at that time. Moreover, in a D-phase (Data phase) period TD after the electric charge is transferred from the photodiode 41 to the floating diffusion 49, the transistor 44 outputs, as the signal SIG, a voltage Vsig corresponding to the voltage of the floating diffusion 49 at that time.

It is to be noted that the configuration of the pixel block BL is not limited to the configuration illustrated in FIG. 4. Specifically, in this example, although one floating diffusion 49 is provided, the configuration is not limited thereto. Alternatively, the floating diffusion may be provided in each of the pixels P1 to P16, for example.

The imaging controller 22 (FIG. 2) controls an operation of the image sensor 20 by supplying a control signal to the drive unit 23 on the basis of the imaging control signal Sctr1.

The drive unit 23 performs readout driving on the pixel array 21. The drive unit 23 includes the scanner 24 and the readout unit 50.

The scanner 24 controls an operation of each of the plurality of pixel blocks BL included in the pixel array 21, on the basis of the control signal supplied from the imaging controller 22. Specifically, the scanner 24 supplies, to each of the pixel blocks BL, each set of signals including the transfer control signals TG1 to TG16, the reset control signal RST, and the output control signal OUT. This leads to sequential selection of the pixels P1 to P16 in each of the pixel blocks BL and output of the signal SIG including the voltage Vreset and the voltage Vsig related to the pixels P1 to P16. Thus, in the imaging apparatus 1, separately controlling the respective pixel blocks BL allows the respective pixel blocks BL to perform operations different from one another.

The readout unit 50 generates the image signal Spic on the basis of the control signal supplied from the imaging controller 22 and the signal SIG supplied from each of the pixel blocks BL.

FIG. 5 illustrates a configuration example of the readout unit 50. This diagram depicts the imaging controller 22, in addition to the readout unit 50. The readout unit 50 includes a reference signal generator 51, a plurality of AD (Analog/Digital) converters ADC (9 AD converters ADC1 to ADC9 in this example), an image signal generator 55, and a readout controller 56.

The reference signal generator 51 generates a reference signal REF. In this example, the reference signal REF has a so-called ramp waveform of which a voltage level gradually declines as time elapses, in the P-phase period TP and the D-phase period TD.

FIG. 6 illustrates a waveform example of the reference signal REF. As illustrated in FIG. 6, the reference signal generator 51 generates the reference signal REF having the ramp waveform in the P-phase period TP and the D-phase period TD. In this example, a waveform W1 has a large inclination of the ramp waveform, a waveform W2 has a medium inclination of the ramp waveform, and a waveform W3 has a small inclination of the ramp waveform. Specifically, the inclination of the ramp waveform in the waveform W1 is twice the inclination of the ramp waveform in the waveform W2, and the inclination of the ramp waveform in the waveform W3 is half of the inclination of the ramp waveform in the waveform W2. The reference signal generator 51 is thus able to change the inclination of the ramp waveform on the basis of the control signal supplied from the readout controller 56.

The AD converter ADC performs AD conversion on the basis of the signal SIG (the voltage Vreset and the voltage Vsig) supplied from the pixel block BL. Each of the plurality of ADC converters ADC is provided for a corresponding one of the plurality of pixel blocks BL. The ADC converters ADC each have a comparator 53 and a counter 54.

The comparator 53 compares the signal SIG supplied from the pixel block BL corresponding to the AD converter ADC thereof with the reference signal REF, and outputs a result of such comparison as a comparison signal CMP.

The counter 54 performs a count-up operation or a count-down operation, on the basis of the comparison signal CMP, and a clock signal CLK and a control signal CC that are supplied from the readout controller 56. Specifically, in the P-phase period TP, the counter 54 starts the count-down operation on the basis of the control signal CC and stops the count-down operation on the basis of the comparison signal CMP, as described later. Moreover, in the D-phase period TD, the counter 54 starts the count-up operation on the basis of the control signal CC and stops the count-up operation on the basis of the comparison signal CMP. Then, the counter 54 outputs a final count value thereof after the D-phase period TD.

The image signal generator 55 generates the image signal Spic on the basis of the final count values supplied from the AD converters ADC1 to ADC 9. At that time, the image signal generator 55 corrects the final count value in accordance with the inclination of the ramp waveform in the reference signal REF and a length of an accumulation time tc (to be described later) on the basis of the control signal supplied from the readout controller 56, thereby obtaining a pixel value PV and generating the image signal Spic on the basis of the pixel value PV.

On the basis of an instruction from the imaging controller 22, the readout controller 56 controls operations of the ADC converters ADC1 to ADC9 by generating the clock signal CLK and the control signal CC and supplying the clock signal CLK and the control signal CC to the ADC converters ADC1 to ADC9. The readout controller 56 also controls operations of the reference signal generator 51 and the image signal generator 55 by supplying the control signal to the reference signal generator 51 and the image signal generator 55.

With this configuration, the readout unit 50 obtains the pixel value PV by performing AD conversion of the voltage Vsig and AD conversion of the voltage Vreset and correcting a difference value between results of such AD conversion. The image sensor 20 is able to remove a noise component included in the voltage Vsig by performing such correlated double sampling. Consequently, the image apparatus 1 is able to improve image quality.

Moreover, as illustrated in FIG. 6, in the readout unit 50, the inclination of the ramp waveform in the reference value REF is changeable. As described later, for example, in a case where the reference signal REF having the waveform W3 is used, it is possible to double a resolution in AD conversion, as compared with a case where the reference signal REF having the waveform W2 is used, thus making it possible to perform the AD conversion with higher precision. Further, in a case where the reference signal REF having the waveform W1 is used, for example, it is possible to shorten an AD conversion time, as compared with a case where the reference signal having the waveform W2 is used. Consequently, it is possible to increase a frame rate in the imaging operation.

The actuator 12 in FIG. 1 includes a touch panel or various types of buttons, for example, and receives an actuation from a user. Then, the actuator 12 generates the control signal on the basis of the actuation from the user and supplies the control signal to the processor 30. The memory 13 includes a nonvolatile semiconductor memory, for example, and stores imaging data supplied from the processor 30. The monitor 14 is configured using a liquid crystal display, for example, and displays an image on the basis of the imaging data supplied from the processor 30.

The processor 30 performs signal processing on the basis of the image signal Spic and includes an integrated circuit, for example. The processor 30 may include hardware, or may have all or some of functions executed by software. The processor 30 includes a controller 31, a moving object detector 32, a moving object velocity detector 33, an image processor 34, a memory controller 35, and a display image generator 36.

The controller 31 controls an operation of the imaging apparatus 1. Specifically, the controller 31 controls operations of respective blocks in the processor 30, on the basis of control signals supplied from the actuator 12, the moving object detector 32, and the moving object velocity detector 33. Moreover, the controller 31 controls the operation of the image sensor 20 by generating the imaging control signal Sctr1 and supplying this imaging control signal Sctr1 to the image sensor 20. At that time, the controller 31 is able to set a driving method for each of the pixel blocks BL, on the basis of detection results by the moving object detector 32 and the moving object velocity detector 33.

The moving object detector 32 detects a moving object on the basis of the image signal Spic. Specifically, the moving object detector 32 detects the moving object on the basis of a time change in the pixel value PV in a predetermined pixel P (detection pixel Q) of the plurality of pixels P in the image sensor 20.

FIG. 7 illustrates an example of arrangement of the detection pixels Q in the pixel array 21. In this example, the pixels P that are arranged in an outermost side of the plurality of pixels P in the pixel array 21 are used as the detection pixels Q.

In the imaging apparatus 1, for example, the image sensor 20 first acquires only the pixel values PV in these detection pixels Q at a predetermined frequency. Then, the moving object detector 32 detects the time change in the pixel values PV in the detection pixels Q. That is, in this example, the detection pixels Q are arranged in the outermost side of the plurality of pixels P in the pixel array 21; therefore, in a case where the moving object enters an imageable region of the image sensor 20, the pixel values PV in some of the detection pixels Q of the plurality of detection pixels Q change with that moving object. In a case where such a time change occurs in the pixel values PV in the detection pixels Q, the moving object detector 32 notifies the controller 31 of a position of the pixel block BL including such detection pixels Q. Then, the controller 31 instructs the image sensor 20 to acquire the pixel values PV of all the pixels P1 to P6 in the pixel block BL notified by the moving object detector 32.

The moving object velocity detector 33 detects a velocity V of the moving object on the basis of the image signal Spic. Specifically, the moving object velocity detector 33 detects the velocity V of the moving object on the basis of the pixel values PV in the pixels P1 to P16 of the pixel block BL where the moving object has been detected by the moving object detector 32. Then, the moving object velocity detector 33 notifies the controller 31 of the detected velocity V of the moving object. The controller 31 sets the driving method in that pixel block BL on the basis of the velocity V of the moving object that has been detected by the moving object velocity detector 33.

The image processor 34 generates an image signal Spic2 by, for example, performing predetermined image processing such as white balance adjustment on the basis of the image signal Spic. The memory controller 35 causes the memory 13 to store an image on the basis of the image signal Spic2. The display image generator 36 generates a display image to be displayed on the monitor 14, by performing predetermined image processing on the basis of the imaging signal Spic2.

Here, the pixel array 21 corresponds to a specific example of an "imaging device" of the present disclosure. The drive unit 23 and the controller 31 correspond to a specific example of a "controller" of the present disclosure. The comparator 53 corresponds to a specific example of a "comparison unit" of the present disclosure.

[Operation and Workings]

In the following, an operation and workings of the imaging apparatus 1 of the embodiment are described.

(Outline of Overall Operation)

First, description is given of an outline of an overall operation of the imaging apparatus 1 with reference to FIG. 1. The image sensor 20 performs the imaging operation on the basis of the imaging control signal Sctr1 and supplies an acquired taken image to the processor 30 as the image signal Spic. The moving object detector 32 detects the moving object on the basis of the time change in the pixel values PV in the detection pixels Q of the plurality of pixels P in the image sensor 20. The moving object velocity detector 33 detects the velocity V of the moving object on the basis of the pixel values PV of the pixels P1 to P16 in the pixel block BL where the moving object has been detected by the moving object detector 32. The controller 31 controls the operations of the respective blocks in the processor 30 on the basis of the control signals supplied from the actuator 12, the moving object detector 32, and the moving object velocity detector 33. The controller 31 also controls the operation of the image sensor 20 by generating the imaging control signal Sctr1 and supplying this imaging control signal Sctr1 to the image sensor 20. The image processor 34 generates the image signal Spic2, for example, by performing the predetermined image processing such as the white balance adjustment, on the basis of the image signal Spic. The memory controller 35 causes the memory 13 to store the image on the basis of the image signal Spic2. The memory 13 stores the imaging data supplied from the memory controller 35. The display image generator 36 generates the display image to be displayed on the monitor 14, by performing the predetermined image processing on the basis of the imaging signal Spic2. The monitor 14 displays the display image generated by the display image generator 36.

(Detailed Operation)

In the image sensor 20, first, the pixel P performs an accumulation operation M1, and thereafter, the readout unit 50 performs a readout operation M2 on that pixel P. In the accumulation operation M1, the photodiode 41 generates the electric charge corresponding to the amount of received light and internally accumulates the electric charge. Moreover, in the readout operation M2, the pixel block BL sequentially outputs the voltage Vreset and the voltage Vsig, and the readout unit 50 obtains the pixel value PV on the basis of the voltage Vreset and the voltage Vsig. Here, the accumulation operation M1 corresponds to a specific example of an "imaging operation" of the present disclosure. The readout operation M2 corresponds to a specific example of the "readout operation" of the present disclosure.

FIGS. 8A, 8B, 8C, 8D, 8E, 8F, 8G, and 8H illustrate an example of the readout operation M2 on the pixel P1 of a concerned pixel block BL1, where FIG. 8A represents a waveform of the reset control signal RST, FIG. 8B represents a waveform of the transfer control signal TG1, FIG. 8C represents a waveform of the output control signal OUT, FIG. 8D represents a waveform of the reference signal REF, FIG. 8E represents a waveform of the signal SIG, FIG. 8F represents a waveform of the comparison signal CMP, FIG. 8G represents a waveform of the clock signal CLK, and FIG. 8H represents a count value CNT in the counter 54. Here, FIGS. 8D and 8E represent the waveforms of the respective signals on a same voltage axis.

In the image sensor 20, in a certain horizontal period (1H), the scanner 24 first causes the pixel block BL1 to perform the reset operation. In the subsequent P-phase period TP, the AD converter ADC1 corresponding to the pixel block BL1 performs the AD conversion on the basis of the voltage Vreset outputted by the pixel block BL1. Then, the scanner 24 causes the pixel P1 to perform the transfer operation. In the D-phase period TD, the AD converter ADC1 performs the AD conversion on the basis of the voltage Vsig outputted by the pixel block BL1. This operation is hereinafter described in detail.

First, at a timing t1, the scanner 24 changes a voltage of the reset control signal RST from a low level to a high level (FIG. 8A). This turns on the transistor 43 in the pixel block BL1. As a result, the voltage of the floating diffusion 49 is set to the source voltage VDD and the voltage of the floating diffusion 49 is reset. Moreover, simultaneously with this, the scanner 24 changes a voltage of the output control signal OUT from the lower level to the high level (FIG. 8C). This turns on the transistor 45 in the pixel block BL1 to electrically couple the pixel block BL1 to the AD converter ADC1.

Next, at a timing t2, the scanner 24 changes the voltage of the reset control signal RST from the high level to the low level (FIG. 8A). This turns off the transistor 43 in the pixel block BL1. Then, after this timing t2, the pixel block BL1 outputs, as the signal SIG, the voltage Vreset corresponding to the voltage of the floating diffusion 49 at this time.

Next, in a period from a timing t3 to a timing t5 (the P-phase period TP), the readout unit 50 performs the AD conversion on the basis of the voltage Vreset. Specifically, first, at the timing t3, the readout controller 56 starts to generate the clock signal CLK (FIG. 8G), and the reference signal generator 51 starts to lower a voltage of the reference signal REF from a voltage V1 by a predetermined degree of change, on the basis of the control signal supplied from the readout controller 56 ((D) of FIG. 8D). In response thereto, the counter 54 of the AD converter ADC1 subsequently performs the count-down operation to sequentially lower the count value CNT (FIG. 8H).

Then, at a timing t4, the voltage of the reference signal REF falls below the voltage Vreset of the signal SIG (FIGS. 8D and 8E). In response thereto, the comparator 53 of the AD converter ADC1 changes a voltage of the comparison signal CMP from the high level to the low level (FIG. 8F). As a result, the counter 54 stops the count-down operation (FIG. 8H). In this manner, the AD converter ADC1 converts the voltage Vreset into a digital value (count value CNT1).

Next, at the timing t5, the readout controller 56 stops generation of the clock signal CLK (FIG. 8G). The reference signal generator 51 stops change of the voltage of the reference signal REF on the basis of the control signal supplied from the readout controller 56, and thereafter returns the voltage of the reference signal REF to the voltage V1 (FIG. 8D). At that time, at a timing t6, the voltage of the reference signal REF exceeds the voltage Vreset of the signal SIG (FIGS. 8D and 8E). In response thereto, the comparator 53 of the AD converter ADC1 changes the voltage of the comparison signal CMP from the low level to the high level (FIG. 8F).

Then, at a timing t7, the scanner 24 changes a voltage of the transfer control signal TG1 from the low level to the high level (FIG. 8B). This turns on the transistor 42 of the pixel P1 in the pixel block BL1. As a result, the electric charge generated in the photodiode 41 of the pixel P1 is transferred to the floating diffusion 49. In response thereto, the voltage of the signal SIG gradually drops (FIG. 8E).

Then, at a timing t8, the scanner 24 changes the voltage of the transfer control signal TG1 from the high level to the low level (FIG. 8B). This turns off the transistor 42 of the pixel P1 in the pixel block BL1. Then, after this timing t8, the pixel block BL1 outputs, as the signal SIG, the voltage Vsig corresponding to the voltage of the floating diffusion 49 at this time.

Next, in a period from a timing t9 to a timing t11 (the D-phase period TD), the readout unit 50 performs the AD conversion on the basis of the voltage Vsig. Specifically, first, at the timing t9, the readout controller 56 starts to generate the clock signal CLK (FIG. 8G), and the reference signal generator 51 starts to lower the voltage of the reference signal REF from the voltage V1 by the predetermined degree of change, on the basis of the control signal supplied from the readout controller 56 ((D) of FIG. 8D). In response thereto, the counter 54 of the AD converter ADC1 subsequently performs the count-up operation to sequentially increase the count value CNT (FIG. 8H).

Then, at a timing t10, the voltage of the reference signal REF falls below the voltage Vsig of the signal SIG (FIGS. 8D and 8E). In response thereto, the comparator 53 of the AD converter ADC1 changes the voltage of the comparison signal CMP from the high level to the low level (FIG. 8F). As a result, the counter 54 stops the count-up operation (FIG. 8H). In this manner, the AD converter ADC1 converts the voltage Vsig into a digital value (count value CNT2). Then, the AD converter ADC1 outputs the count value CNT (CNT2-CNT1).

Next, at the timing t11, the readout controller 56 stops the generation of the clock signal CLK (FIG. 8G). The reference signal generator 51 stops change of the voltage of the reference signal REF on the basis of the control signal supplied from the readout controller 56, and thereafter returns the voltage of the reference signal REF to the voltage V1 (FIG. 8D). At that time, at a timing t12, the voltage of the reference signal REF exceeds the voltage Vsig of the signal SIG (FIGS. 8D and 8E). In response thereto, the comparator 53 of the AD converter ADC1 changes the voltage of the comparison signal CMP from the low level to the high level (FIG. 8F).

Next, at a timing t13, the scanner 24 changes the voltage of the output control signal OUT from the high level to the low level (FIG. 8C). This turns off the transistor 45 in the pixel block BL1 to electrically decouple the pixel block BL1 from the AD converter ADC1.

Then, the image signal generator 55 corrects the count value CNT in accordance with the inclination of the ramp waveform in the reference signal REF and the length of the time for the pixel P to perform the accumulation operation M1 (accumulation time tc) on the basis of the control signal supplied from the readout controller 56, thereby obtaining the pixel value PV and generating the image signal Spic on the basis of this pixel value PV.

As described above, the image sensor 20 determines a difference between the digital values (CNT2-CNT1) by performing AD conversion on the voltage Vreset to acquire the digital value (count value CNT1) and performing AD conversion on the voltage Vsig to acquire the digital value (count value CNT2). The image sensor 20 performs the correlated double sampling in this manner, thus making it possible to remove the noise component included in the voltage Vsig and consequently improve the image quality of the taken image.

(Setting of Driving Method)

The imaging apparatus 1 sets a driving method for each pixel block BL on the basis of the detection results by the moving object detector 32 and the moving object velocity detector 33. This operation is hereinafter described in detail.

FIG. 9 illustrates an operation example of the imaging apparatus 1. The imaging apparatus 1 first detects the time change in the pixel value PV in the detection pixel Q. Then, in a case where the time change occurs in the pixel value PV in the detection pixel Q, the velocity V of the moving object is detected on the basis of the pixel values PV of all the pixels P1 to P6 in the pixel blocks BL including the detection pixel Q, and the driving method in that pixel block is set on the basis of the velocity V of the moving object. This operation is hereinafter described in detail.

First, the image sensor 20 performs the readout operation M2 on the detection pixel Q on the basis of an instruction from the controller 31 (step S1). At that time, the image sensor 20 performs the readout operation M2 on, for example, any pixels P other than the detection pixel Q at a lower frequency.

Next, the moving object detector 32 checks whether or not the moving object has been detected (step S2). Specifically, the moving object detector 32 checks whether or not the moving object has been detected, by detecting the time change in the pixel value PV in the detection pixel Q. In a case where the moving object detector 32 has not detected the moving object ("N" in the step S2), the moving object detector 32 returns to the step S1, and the moving object detector 32 repeats the steps S1 and S2 until detecting the moving object.

In a case where the moving object has been detected in the step S2, on the basis of the instruction from the controller 31, the image sensor 20 performs the readout operation M2 on all the pixels P in the pixel block BL where the moving object has been detected (step S3). The image sensor 20 performs such a readout operation M2 at the predetermined frequency. Accordingly, the processor 30 sequentially acquires images in that pixel block BL.

Next, the moving object velocity detector 33 detects the velocity V of the moving object (step S4). Specifically, the moving object velocity detector 33 detects the velocity V of the moving object on the basis of a plurality of images sequentially acquired in step S3.

Next, the controller 31 checks whether or not the velocity V of the moving object is faster than a predetermined velocity Vth (V>Vth) (step S5).

In a case where the velocity V of the moving object is faster than the predetermined velocity Vth ("Y" in the step S5), on the basis of the instruction from the controller 31, the image sensor 20 increases the frame rate in the pixel block BL where the moving object has been detected (step S6). Specifically, the image sensor 20 increases the frame rate by, for example, shortening time to perform the readout operation M2, as described later. This enables the imaging apparatus 1 to clearly image the moving object that moves quickly.

Moreover, in a case where the velocity V of the moving object is not faster than the predetermined velocity Vth ("N" in the step S5), on the basis of the instruction from the controller 31, the image sensor 20 reduces the frame rate in the pixel block BL where the moving object has been detected (step S7). Specifically, the image sensor 20 reduces the frame rate by, for example, extending the time to perform the readout operation M2, as described later. This enables the imaging apparatus 1 to finely image the moving object that moves slowly, at a high resolution, for example.

It is to be noted that in this example, the frame rate in the pixel block BL where the moving object has been detected is increased in the case where the velocity V of the moving object is faster than the predetermined velocity Vth. However, the present disclosure is not limited thereto. For example, in the case where the velocity V of the moving object is faster than the predetermined velocity Vth, AD conversion may be performed at a higher resolution on the pixel block BL where the moving object has been detected, through reduction of the inclination of the ramp waveform of the reference signal REF. The user may set this operation in advance by using the actuator 12.

Next, the controller 31 checks whether or not the user has given an instruction to finish shooting (step S8). In a case where the instruction to finish shooting has not been given ("N" in the step 8), the controller 31 returns to the step S1. Moreover, in a case where the instruction to finish shooting has been given ("Y" in the step 8), this flow ends.

(Changing Frame Rate)

Changing of the frame rate in the steps S6 and S7 of FIG. 9 is described in the following.

FIGS. 10A and 10B illustrate an operation example of the image sensor 20, where FIG. 10A illustrates a case where the frame rate is low, and FIG. 10B illustrates a case where the frame rate is high. In this example, the plurality of pixels P in the pixel block BL sequentially starts the accumulation operation M1 at intervals of time Δt. Then, after the pixels P perform the accumulation operation M1 over a predetermined period of time, the readout unit 50 performs the readout operation M2 on the pixels P.

As illustrated in FIG. 10A, in a case where the frame rate is made low, in this example, the image sensor 20 extends the accumulation time tc to perform the accumulation operation M1, and extends readout time tr to perform the readout operation M2. This extends scan time tscan, thus reducing the frame rate. Moreover, as illustrated in FIG. 10B, in a case where the frame rate is made high, in this example, the image sensor 20 shortens the accumulation time tc, and shortens the readout time tr. This shortens the scan time tscan, thus increasing the frame rate.

(A) to (G) of FIG. 11 illustrate an example of the readout operation M2 on the pixel P1 in the case where the frame rate is low. (H) to (N) of FIG. 11 illustrate an example of the readout operation M2 on the pixel P1 in the case where the frame rate is high.

In the case where the frame rate is low, as illustrated in (A) to (G) of FIG. 11, the pixel block BL performs the reset operation, output of the voltage Vreset, the transfer operation, and output of the voltage Vsig on the basis of the reset control signal RST, the transfer control signal TG1, and the output control signal OUT in a period from the timing t11 to the timing t12. In the case where the frame rate is low, the reference signal generator 51 reduces the inclination of the ramp waveform in the reference signal REF ((D) of FIG. 11). Then, the AD converter ADC performs the AD conversion using such a reference signal REF. This enables the readout unit 50 to increase the resolution in the AD conversion, thus making it possible to perform the AD conversion with higher precision. This enables the imaging apparatus 1 to finely image the moving object at a higher resolution, for example.

Moreover, in the case where the frame rate is high, as illustrated in (H) to (N) of FIG. 11, the pixel block BL performs the reset operation, the output of the voltage Vreset, the transfer operation, and the output of the voltage Vsig on the basis of the reset control signal RST, the transfer control signal TG1, and the output control signal OUT in a period from the timing t13 to a timing t14. In the case where the frame rate is high, the reference signal generator 51 increases the inclination of the ramp waveform in the reference signal REF ((K) of FIG. 11). Then, the AD converter ADC performs the AD conversion using such a reference signal REF. This enables the readout unit 50 to shorten the readout time tr and shorten the scan time tscan. This enables the imaging apparatus 1 to clearly image the moving object that moves quickly.

The image signal generator 55 determines the pixel value PV by correcting the count value CNT in accordance with the inclination of the ramp waveform in the reference signal REF. At this time, in the case where the frame rate is high, for example, the inclination of the ramp waveform is large, and thus the final count value of the counter 54 is smaller than that in the case where the frame rate is low. It is to be noted that in this example, as illustrated in FIG. 10B, the length of the accumulation time tc is also made short and thus the final count value of the counter 54 is still smaller. Therefore, the image signal generator 55 determines the pixel value PV by correcting the final count value of the counter 54 in accordance with the inclination of the ramp waveform in the reference signal REF and the length of the accumulation time tc. This enables the imaging apparatus 1 to obtain a similar pixel value PV independently of the frame rate.

As described above, the imaging apparatus 1 controls, depending on a subject, the driving method for each of the plurality of the pixel blocks BL. Specifically, the imaging apparatus 1 changes the driving method for the pixel block BL where the moving object has been detected, in accordance with the velocity V of that moving object. This enables the imaging apparatus 1 to select an appropriate shooting method depending on the subject for each of the pixel blocks BL. For example, in a case where the frame rate is changed with the velocity V of the moving object, the imaging apparatus 1 is able to clearly image the moving object that moves quickly. Moreover, in a case where the resolution of the AD conversion is increased with the velocity V of the moving object, for example, the imaging apparatus 1 is able to finely image the moving object at a high resolution. As a result, the imaging apparatus 1 is able to improve the image quality of the taken image.

Further, in a case where the imaging apparatus 1 performs the readout operation M2 on the detection pixel Q and detects the moving object on the basis of the pixel value PV in the detection pixel Q, the imaging apparatus 1 performs the readout operation M2 on all the pixels P1 to P16 in the pixel block BL including that detection pixel Q. This enables the readout operation M2 to be performed on any pixels P other than the detection pixel Q at a lower frequency before the moving object is detected, thus making it possible to reduce power consumption.

In the imaging apparatus 1, in particular, the detection pixels Q are arranged on the outermost side of the plurality of pixels P in the pixel array 21. This enables the readout operation M2 to be performed on any pixels P other than the detection pixels Q of the plurality of pixels P in the pixel array 21 at a lower frequency before the moving object enters the imageable region of the image sensor 20. Hence, it is possible to reduce the power consumption.

Moreover, the imaging apparatus 1 controls the frame rate in the pixel block BL in accordance with the velocity V of the moving object, thus making it possible to reduce the frame rate in the pixel block BL in which the velocity V of the moving object is low. Hence, it is possible to reduce the power consumption.

Effects

As described above, in the embodiment, the driving method for each of the plurality of pixel blocks is controlled depending on the subject, thus making it possible to select an appropriate shooting method for each of the pixel blocks, depending on the subject. As a result, it is possible to improve the image quality of the taken image.

In the embodiment, in a case where the readout operation is performed on the detection pixel and the moving object is detected on the basis of the pixel value in the detection pixel, the readout operation is performed on all the pixels in the pixel block including the detection pixel, thus making it possible to reduce the power consumption.

In the embodiment, the detection pixels are arranged on the outermost side of the plurality of pixels in the pixel array. This enables the readout operation to be performed on any pixels other than the detection pixel of the plurality of pixels in the pixel array at a lower frequency before the moving object enters the imageable region of the image sensor. Hence, it is possible to reduce the power consumption.

In the embodiment, the frame rate in the pixel block is controlled in accordance with the velocity of the moving object, thus making it possible to reduce the power consumption.

Modification Example 1

In the foregoing embodiment, although both the accumulation time tc and the readout time tr are changed on the basis of the velocity V of the moving object, the embodiment is not limited thereto. Alternatively, for example, the accumulation time tc may be changed on the basis of the velocity V of the moving object, or the readout time tr may be changed on the basis of the velocity V of the moving object. Moreover, in the foregoing embodiment, although the frame rate is changed on the basis of the velocity V of the moving object, the embodiment is not limited thereto, and the resolution in the AD conversion may be changed.

Modification Example 2

In the foregoing embodiment, in a case where the moving object detector 32 detects the moving object on the basis of the pixel value PV in the detection pixel Q, the image sensor 20 performs the readout operation M2 on all the pixels P in the pixel block BL including the detection pixel Q. However, the embodiment is not limited thereto. In addition thereto, for example, in a case where the moving object velocity detector 33 detects the velocity V of the moving object in a certain pixel block BL and consequently determines that the moving object is moving to an adjacent pixel block BL, the image sensor 20 may perform the readout operation M2 on all the pixels P in the adjacent pixel block BL to which the moving object is moving.

Modification Example 3

In the foregoing embodiment, although the detection pixels Q are arranged on the outermost side of the plurality of pixels P in the pixel array 21, the embodiment is not limited thereto. Alternatively, for example, the detection pixels Q are uniformly arranged throughout the pixel array 21, as illustrated in FIG. 12. This also makes it possible to detect an object as the moving object in a case where the object standing still in the imageable region starts to move, for example, in addition to the case where the moving object enters the imageable region of the image sensor 20.

Modification Example 4

In the foregoing embodiment, as illustrated in FIG. 9, the image sensor 20 performs the readout operation M2 on all the pixels P1 to P16 in the pixel block BL where the moving object has been detected (step S3), and the moving object velocity detector 33 determines the velocity V of the moving object on the basis of the pixel values PV in the pixels P1 to P16 (step S4). However, the embodiment is not limited thereto. For example, in a case where the detection pixels Q are arranged as illustrated in FIG. 12, the moving object velocity detector 33 may determine the velocity V of the moving object on the basis of the pixel values PV in the detection pixels Q. That is, in a case where the detection pixels Q are arranged as illustrated in FIG. 12, it is possible for the imaging apparatus 1 to acquire a rough taken image on the basis of the pixel values PV in the detection pixels Q. Therefore, it is possible to determine the velocity V of the moving object on the basis of the rough taken image.

Modification Example 5

In the foregoing embodiment, although the processor 30 includes the integrated circuit, the embodiment is not limited thereto. Alternatively, all or some of the blocks of the processor 30 may be integrated in the image sensor, for example. Specifically, as with an imaging apparatus 1E illustrated in FIG. 13, for example, the moving object detector 32 and the moving object velocity detector 33 may be integrated in an image sensor 20E. The imaging apparatus 1E includes the image sensor 20E and a processor 30E. The image sensor 20E includes a controller 311E, the moving object detector 32, and the moving object velocity detector 33. The processor 30E includes a controller 312E. The controllers 311E and 312E correspond to the controller 31 in the foregoing embodiment. It is to be noted that the embodiment is not limited thereto, and, for example, the image processor 34 may also be integrated in the image sensor.

Modification Example 6

In the foregoing embodiment, although the image processor 34 performs the predetermined image processing on the basis of the image signal Spic, at that time, the image processor 34 may also perform so-called blending processing on an overall image. That is, in a case where the driving method differs depending on the pixel block BL, an image near a boundary of the pixel block BL may be unnatural. Performing the blending processing on the overall image in this manner makes it possible to make unnaturalness of the image near the boundary of the pixel block BL inconspicuous.

Modification Example 7

In the foregoing embodiment, although the driving method for each of the plurality of pixel blocks BL is controlled depending on the subject, at that time, the image processor 34 may determine a type of the subject and set the driving method in accordance with the type, for example. Specifically, for example, in a case where both a man and a vehicle are detected as the moving object in one area (pixel block BL), the moving object velocity detector 33 may detect the velocity V of the man and not the velocity V of the vehicle. That is, in this example, the imaging apparatus 1 is set to give a higher priority to the man than to the vehicle. Moreover, for example, in a case where the man is detected as the moving object in one area and the vehicle is detected as the moving object in another area, the driving method for the pixel block where the vehicle is detected may be changed without changing the driving method for the pixel block BL where the man is detected. In this example, the imaging apparatus 1 is set to give a higher priority to the vehicle than to the man. Here, the image processor 34 corresponds to a specific example of an "image recognizer" of the present disclosure.

Modification Example 8

In the foregoing embodiment, the moving object velocity detector 33 detects the velocity V of the moving object, but may also acquire deepness information (depth information) of that moving object at that time. In this case, the controller 31 may control the driving method for each of the plurality of pixel blocks BL on the basis of the depth information.

Modification Example 9

In the foregoing embodiment, although the accumulation time tc is controlled, at that time, the accumulation time tc may be shortened and the imaging operation may be performed a plurality of times in a certain area, thereby synthesizing a plurality of taken images thus-obtained.

Modification Example 10

In the foregoing embodiment, although the plurality of pixels P are provided in the pixel array 21, some of the pixels other than the detection pixel Q of the plurality of pixels P may include a pixel that is able to detect an infrared ray. In a case where the moving object detector 32 detects the moving object, the readout operation M2 may be performed on the pixel that is able to detect the infrared ray.

Modification Example 11

In the foregoing embodiment, although the display image generator 36 generates the display image to be displayed on the monitor 14 by performing the predetermined image processing on the basis of the image signal Spic2, at that time, an operation mode to display a frame surrounding the detected moving object on the monitor 14 may be provided. FIG. 14 illustrates an example of a display image PP to be displayed on the monitor 14 in this operation mode. In this example, a running vehicle (moving object) is detected and a frame FA surrounding the vehicle is displayed. In FIG. 14, a region RA represents an area (one or more pixel blocks BL) for which the driving method is changed on the basis of a moving object detection result. In this example, on the basis of the detection result in the moving object detector 33, the controller 31 recognizes an overall image of the running vehicle and a running direction thereof (a left-hand direction in this example), and increases, for example, the frame rate in the region RA that includes the entire running vehicle and is provided with a margin in a running direction of the vehicle. It is to be noted that in this example, although the region RA is larger than the frame FA, the embodiment is not limited thereto. Alternatively, the region RA may match the frame FA, for example.

Other Modification Examples

In addition, two or more of these modification examples may be combined.

2. Application Example

In the following, an application example of the imaging apparatus described in the foregoing embodiment and modification examples is described.

FIG. 15 illustrates an external appearance of a video camera to which the imaging apparatus according to any of the foregoing embodiment, etc. is applied. The video camera includes a main body 610, a lens 620, a start/stop switch 630, and a display 640, for example. The imaging apparatus according to any of the foregoing embodiment, etc. is applied to the video camera.

The imaging apparatus according to any of the foregoing embodiment, etc. is applicable to electronic apparatuses in every field such as a digital camera, a stereo camera, and a mobile terminal apparatus such as a mobile phone, in addition to such a video camera, the imaging apparatus is applicable to a surveillance camera that monitors a face, a person, a vehicle, etc., for example. The imaging apparatus may also be applied to a vehicle-mounted camera that monitors pedestrians, vehicles, traffic lights, etc., for example.

The technology has been described above with reference to some embodiments and modification examples, and the application examples thereof; however, the technology is not limited to the foregoing embodiments, etc., and may be modified in a variety of ways.

The respective embodiments described above involve an example in which the imaging apparatus 1 takes a moving image, but are not limited thereto. For example, the imaging apparatus 1 may take a still image or take consecutive images. The imaging apparatus 1 may also take a time-lapse moving image. In this case, it is possible to set the accumulation time tc or the resolution in the AD conversion for each of the pixel blocks BL, for example.

The respective embodiments described above involve an example in which the plurality of pixels P included in the pixel block BL configure one rectangular area, but are not limited thereto. Alternatively, for example, the plurality of pixels P included in the pixel block BL may configure a band-shaped area that extends in a vertical direction.

It is to be noted that the effects described here are merely illustrative and non-limiting, and may further include other effects.

It is to be noted that the technology may have the following configurations.

(1)
An imaging control apparatus, including:
a controller that performs a readout operation on a plurality of pixels in an imaging device, and performs control on the basis of a moving object detection result to cause a time length of the readout operation on a first pixel to differ from a time length of the readout operation on a second pixel, the first pixel corresponding to a detection region where a moving object has been detected, and the second pixel corresponding to a region other than the detection region.

(2)
The imaging control apparatus according to (1), in which the controller further performs an imaging operation on the plurality of pixels, and performs control to cause a time length of the imaging operation on the first pixel to differ from a time length of the imaging operation on the second pixel.

(3)
The imaging control apparatus according to (1) or (2), in which the controller performs the readout operation by converting a pixel signal supplied from a pixel to be subjected to the readout operation into a pixel period having a length corresponding to a signal level of the pixel signal, and performing an AD conversion operation on the basis of the length of the pixel period.

(4)
The imaging control apparatus according to (3), in which the controller includes a reference signal generator and a comparison unit, the reference signal generator generating a reference signal of which a signal level sequentially changes and the comparison unit comparing the pixel signal with the reference signal to generate a comparison signal, and the controller detects the length of the pixel period on the basis of the comparison signal.

(5)
The imaging control apparatus according to (4), in which the controller controls a degree of change in the signal level of the reference signal to control the time length of the readout operation.

(6)
The imaging control apparatus according to any one of (1) to (5), in which the controller controls the time length of the readout operation to control a frame rate.

(7)
The imaging control apparatus according to any one of (1) to (6), in which the controller controls the time length of the readout operation to control a resolution of an AD conversion operation on a pixel signal supplied from a pixel to be subjected to the readout operation.

(8)
The imaging control apparatus according to any one of (1) to (7), in which the controller further controls the time length of the readout operation on the basis of a recognition result in an image recognizer that recognizes a subject.

(9)
The imaging control apparatus according to any one of (1) to (8), in which the readout operation is performed on outer-side arranged pixels of the plurality of pixels in the imaging device, and the time length of the readout operation is controlled on the basis of the moving object detection result that utilizes a readout result of the readout operation.

(10)
The imaging control apparatus according to any one of (1) to (8), in which the readout operation is performed on pixels spaced from one another of the plurality of pixels in the imaging device, and the time length of the readout operation is controlled on the basis of the moving object detection result that utilizes a readout result of the readout operation.

(11)

The imaging control apparatus according to any one of (1) to (10), further including the imaging device.

(12)

The imaging control apparatus according to any one of (1) to (11), in which the controller causes the time length of the readout operation on the first pixel to be shorter than the time length of the readout operation on the second pixel.

(13)

The imaging control apparatus according to any one of (1) to (11), in which the controller causes the time length of the readout operation on the first pixel to be longer than the time length of the readout operation on the second pixel.

(14)

The imaging control apparatus according to (2), in which the controller causes the time length of the imaging operation on the first pixel to be shorter than the time length of the imaging operation on the second pixel.

(15)

An imaging control method, including:

performing a readout operation on a plurality of pixels in an imaging device; and performing control on the basis of a moving object detection result to cause a time length of the readout operation on a first pixel to differ from a time length of the readout operation on a second pixel, the first pixel corresponding to a detection region where a moving object has been detected, and the second pixel corresponding to a region other than the detection region.

(16)

A program causing an imaging control apparatus to:

perform a readout operation on a plurality of pixels in an imaging device; and perform control on the basis of a moving object detection result to cause a time length of the readout operation on a first pixel to differ from a time length of the readout operation on a second pixel, the first pixel corresponding to a detection region where a moving object has been detected, and the second pixel corresponding to a region other than the detection region.

This application is based upon and claims priority from Japanese Patent Application No. 2016-039868 filed with the Japan Patent Office on Mar. 2, 2016, the entire contents of which are incorporated herein by reference.

It should be understood that those skilled in the art could conceive various modifications, combinations, sub-combinations, and alterations depending on design requirements and other factors, insofar as they are within the scope of the appended claims or the equivalents thereof.

The invention claimed is:

1. An imaging control apparatus, comprising:
an imaging device that includes a plurality of first pixels, wherein the plurality of pixels includes a plurality of detection pixels;
a moving object velocity detector configured to detect a velocity of a moving object based on pixel values of the plurality of detection pixels; and
a controller configured to:
execute a readout operation on each of the plurality of first pixels, wherein
the readout operation on one of a first pixel of the plurality of pixels or a second pixel of the plurality of pixels is executed based on a conversion of a pixel signal supplied from the one of the first pixel or the second pixel into a pixel period, and
the pixel period has a length corresponding to a signal level of the pixel signal;
execute an analog to digital (AD) conversion operation based on the length of the pixel period and
control, based on the detected velocity of the moving object, a first time length of the readout operation on Rare first pixel to differ from a second time length of the readout operation on the second pixel, wherein
the first pixel corresponds to a first region of detection of the moving object, and
the second pixel corresponds to a second region different from the first region.

2. The imaging control apparatus according to claim 1, wherein the controller is further configured to:
execute an imaging operation on the plurality of pixels; and
control a first time length of the imaging operation on the first pixel to differ from a second time length of the imaging operation on the second pixel.

3. The imaging control apparatus according to claim 1, wherein the controller includes:
a reference signal generator configured to generate a reference signal, wherein a signal level of the reference signal sequentially changes; and
a comparison unit configured to compare the pixel signal with the reference signal to generate a comparison signal,
wherein the controller is further configured to detect the length of the pixel period based on the comparison signal.

4. The imaging control apparatus according to claim 3, wherein the controller is further configured to:
control a degree of change in the signal level of the reference signal; and
control at least one of the first time length or the second time length of the readout operation based on the degree of change.

5. The imaging control apparatus according to claim 1, wherein the controller is further configured to:
control at least one of the first time length or the second time length of the readout operation; and
control a frame rate based on the at least one of the first time length or the second time length of the readout operation.

6. The imaging control apparatus according to claim 1, wherein the controller is further configured to:
control at least one of the first time length or the second time length of the readout operation; and
control a resolution of the AD conversion operation on the pixel signal based on the at least one of the first time length or the second time length of the readout operation.

7. The imaging control apparatus according to claim 1, further comprising an image recognizer configured to recognize a subject,
wherein the controller is further configured to control at least one of the first time length or the second time length of the readout operation based on a recognition result in the image recognizer.

8. The imaging control apparatus according to claim 1, wherein
the readout operation is executed on a plurality of outer-side-arranged pixels of the plurality of first pixels in the imaging device, and
a third time length of the readout operation on the plurality of outer-side-arranged pixels is controlled based on the detected velocity of the moving object.

9. The imaging control apparatus according to claim 1, wherein the controller is further configured to control the first time length of the readout operation on the first pixel such that the first time length of the readout operation is shorter than the second time length of the readout operation on the second pixel.

10. The imaging control apparatus according to claim 1, wherein the controller is further configured to control the first time length of the readout operation on the first pixel such that the first time length of the readout operation is longer than the second time length of the readout operation on the second pixel.

11. The imaging control apparatus according to claim 2, wherein the controller is further configured to control the first time length of the imaging operation on the first pixel such that the first time length of the imaging operation is shorter than the second time length of the imaging operation on the second pixel.

12. An imaging control method, comprising:
   detecting, by a moving object velocity detector, a velocity of a moving object based on pixel values of a plurality of detection pixels in an imaging device;
   executing by a controller, a readout operation on each of a plurality of pixels in the imaging device, wherein
      the plurality of pixels includes the plurality of detection pixels,
      the readout operation on one of a first pixel of the plurality of pixels or a second pixel of the plurality of pixels is executed based on a conversion of a pixel signal supplied from the one of the first pixel or the second pixel into a pixel period, and
      the pixel period has a length corresponding to a signal level of the pixel signal;
   executing, by the controller, an analog to digital (AD) conversion operation based on the length of the pixel period and
      controlling, based on the detected velocity of the moving object, a first time length of the readout operation on the first pixel to differ from a second time length of the readout operation on the second pixel, wherein
      the first pixel corresponds to a first region of detection of the moving object, and
      the second pixel corresponds to a second region different from the first region.

13. A non-transitory computer-readable medium having stored thereon computer-executable instructions that, when executed by a computer, cause the computer to execute operations, the operations comprising:
   detecting a velocity of a moving object based on pixel values of a plurality of detection pixels in an imaging device;
   executing a readout operation on each of a plurality of pixels in the imaging device, wherein
      the plurality of pixels includes the plurality of detection pixels,
      the readout operation on one of a first pixel of the plurality of pixels or a second pixel of the plurality of pixels is executed based on a conversion of a pixel signal supplied from the one of the first pixel or the second pixel into a pixel period, and
      the pixel period has a length corresponding to a signal level of the pixel signal;
   executing an analog to digital (AD) conversion operation based on the length of the pixel period; and
   controlling, based on the detected velocity of the moving object, a first time length of the readout operation on the first pixel to differ from a second time length of the readout operation on the second pixel, wherein
      the first pixel corresponds to a first region of detection of the moving object, and
      the second pixel corresponds to a second region different from the first region.

* * * * *